US009118724B1

(12) United States Patent
Sooriyan et al.

(10) Patent No.: US 9,118,724 B1
(45) Date of Patent: Aug. 25, 2015

(54) GEOGRAPHIC BASED EVENT RECOMMENDATION AND EVENT ATTENDEE NETWORKING

(71) Applicant: LinkedIn Corporation, Mountain View, CA (US)

(72) Inventors: Siva Visakan Sooriyan, San Francisco, CA (US); Asa Kusuma, San Jose, CA (US); Artur Kubalski, Mountain View, CA (US); Vinoth Chandar, Mountain View, CA (US); Hans van de Bruggen, San Jose, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 14/228,126

(22) Filed: Mar. 27, 2014

(51) Int. Cl.
*G06F 15/16* (2006.01)
*H04L 29/08* (2006.01)
*H04L 12/58* (2006.01)

(52) U.S. Cl.
CPC .............. *H04L 67/22* (2013.01); *H04L 51/32* (2013.01); *H04L 67/306* (2013.01)

(58) Field of Classification Search
USPC .......................................................... 709/206
See application file for complete search history.

(56) References Cited

U.S. PATENT DOCUMENTS

| 8,700,540 | B1 * | 4/2014 | Zambrano et al. ............. 705/319 |
| 2002/0118118 | A1 * | 8/2002 | Myllymaki et al. ........ 340/686.1 |
| 2008/0154696 | A1 * | 6/2008 | Spiegelman et al. ........... 705/10 |
| 2009/0287687 | A1 * | 11/2009 | Martire et al. ..................... 707/5 |
| 2013/0036166 | A1 * | 2/2013 | Dunko ........................... 709/204 |
| 2014/0012926 | A1 * | 1/2014 | Narayanan et al. ........... 709/206 |
| 2014/0047023 | A1 * | 2/2014 | Baldwin et al. ............... 709/204 |
| 2014/0059132 | A1 * | 2/2014 | Shelton et al. ................ 709/204 |
| 2014/0089418 | A1 * | 3/2014 | Davenport et al. ........... 709/206 |

OTHER PUBLICATIONS

"Know Before You Go", [Online], Retrieved from the Internet: <URL: http://joinlinkup.com/>, (Accessed Apr. 10, 2014); 4 pgs.

* cited by examiner

*Primary Examiner* — Larry Donaghue
(74) *Attorney, Agent, or Firm* — Schwegman Lundberg & Woessner, P.A.

(57) ABSTRACT

In various example embodiments, a system and method for providing geographic-based event recommendation and event attendee networking are presented. A suggested event may be determined based on location information of a user. The user may be a member among members of a social network service. Event information corresponding to the suggested event may be provided to the user. A user attendance indication may be received from the user. The user attendance indication may indicate that the user may be attending the suggested event. Contact members, from among the members of the social network service, that are associated with the user through the social network service may be identified. An event notification may be communicated to the contact members. The event notification may include the user attendance indication.

18 Claims, 15 Drawing Sheets

GEOGRAPHIC BASED EVENT RECOMMENDATION AND EVENT ATTENDEE NETWORKING

TECHNICAL FIELD

Embodiments of the present disclosure relate generally to online social networking, and more particularly, but not by way of limitation, to geographic based event recommendation and attendee networking.

BACKGROUND

The near ubiquity of mobile devices and wireless networks provides users with access to information virtually anywhere. For example, users of social network services, such as LinkedIn®, may access social networking information via mobile devices. In addition, mobile devices often provide a variety of information using device sensors, such as current location.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
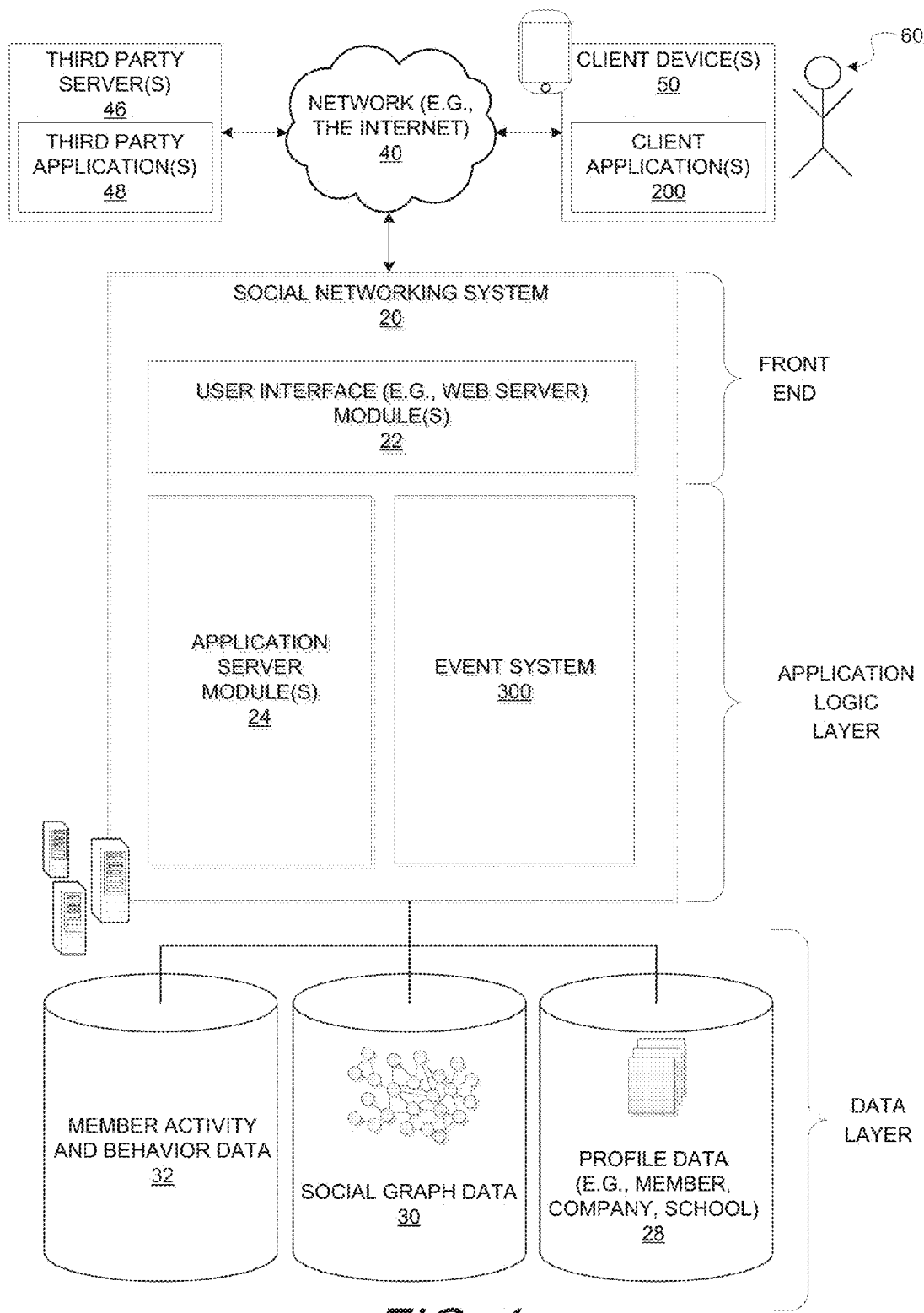
FIG. 1 is a network diagram depicting a client-server system within which various example embodiments may be deployed.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In various example embodiments, systems and methods for recommending events based on geographic location information and facilitating event attendee networking are described. In an example embodiment, location information (e.g., as determined by a global positioning system (GPS) component of a mobile device) corresponding to a member of a social network service may be used to determine suggested events (e.g., a developer conference, a sporting event, a concert, and the like). For instance, events that are within a distance of the user may be identified and recommended to the user. In some example embodiments, a user-specified distance may be used to determine the suggested events. Event information corresponding to the suggested event may be presented to the user. The event information may comprise a wide variety of information including an event description (e.g., event name, event location, event topic, event speakers, event activities, event duration, event price, and so forth), number of event attendees, a list of event attendees, an attendee summary, contact members of the user attending the event, and other event information (event parking, public transportation options, handicap accessible, weather forecast for the event location and time, and so forth).

In various example embodiments, a user attendance indication may be received from the user. The user attendance indication may indicate that the user is attending the suggested event. In some example embodiments, the user attendance indication may be received in response to an attendance trigger. For example, the attendance trigger may be the user moving within a distance of the suggested event (e.g., the user entering the building hosting the event may trigger the attendance indication). In further example embodiments, the user may provide member attendance indications for other members of the social network (e.g., the user may be accompanied by other members of the social network service and may provide attendance indications for the group).

In an example embodiment, contact members of the user (e.g., friends of the user on the social network service) may be identified and provided with an event notification that indicates the user is attending the suggested event. The event notification may include the event information and may facilitate the contact member in attending the suggested event. In some example embodiments, the event notification may only be presented to the contact members within a distance of the suggested event (e.g., only provide the notification to nearby contact members). Similarly, additional contact members of the original contact members may be provided the event notification if the original contact member attends the suggested event and provides an indication of attendance. In this way, awareness of the suggested event may spread via social contacts.

In a further example embodiment, attendee members attending the suggested event may be identified from among the members of the social network service. An attendee list that includes at least a portion of the attendee members may be generated (e.g., there may be hundreds of members that attend an event and only a portion may be included in the attendee list). Various schemes may be employed to determine which attendee members to include in the attendee list. The attendee list may be presented to the user that attended the suggested event after the suggested event has ended. The attendee list may facilitate the user connecting, via the social network service, with people that attended the suggested event.

As shown in FIG. 1, the social networking system 20 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such an architecture.

As shown in FIG. 1, the front end layer consists of a user interface module(s) (e.g., a web server) 22, which receives requests from various client-computing devices including one or more client device(s) 50, and communicates appropriate responses to the requesting device. For example, the user interface module(s) 22 may receive requests in the form of Hypertext Transport Protocol (HTTP) requests, or other web-based, application programming interface (API) requests. The client devices 50 may be executing conventional web browser applications (also referred to as "apps"), or applications that have been developed for a specific platform to include any of a wide variety of mobile computing devices and mobile-specific operating systems. For example, client device(s) 50 may be executing client application(s) 200. The client application(s) 200 may include various components operable to present information to the user and communicate with the network 40 to access the social networking system 20. Each of the client devices 50 may comprise a computing device that includes at least a display and communication capabilities with the network 40 to access the social networking system 20. The client devices 50 may comprise, but are not limited to, remote devices, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. One or more users 60 may be a person, a machine, or other means of interacting with the client device(s) 50. The user(s) 60 may interact with the social networking system 20 via the client device(s) 50. The user(s) 60 may not be part of the networked environment, but may be associated with client device(s) 50.

As shown in FIG. 1, the data layer includes several databases, including a database 28 for storing data for various entities of the social graph, including member profiles, company profiles, educational institution profiles, as well as information concerning various online or offline groups. Of course, with various alternative embodiments, any number of other entities might be included in the social graph, and as such, various other databases may be used to store data corresponding with other entities.

Consistent with some embodiments, when a person initially registers to become a member of the social networking service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database with reference number 28.

Once registered, a member may invite other members, or be invited by other members, to connect via the social networking service. A "connection" may specify a bilateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases.

As members interact with various applications, content, and user interfaces of the social networking system 20, information relating to the member's activity and behavior may be stored in a database, such as the database with reference number 32.

The social networking system 20 may provide a broad range of other applications and services that allow members the opportunity to share and receive information, often customized to the interests of the member. For example, with some embodiments, the social networking system 20 may include a photo sharing application that allows members to upload and share photos with other members. With some embodiments, members of the social networking system 20 may be able to self-organize into groups, or interest groups, organized around a subject matter or topic of interest. With some embodiments, members may subscribe to or join groups affiliated with one or more companies. For instance, with some embodiments, members of the social network service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database with reference number 30.

The application logic layer includes various application server module(s) 24, which, in conjunction with the user interface module(s) 22, generates various user interfaces with data retrieved from various data sources or data services in the data layer. With some embodiments, individual application server modules 24 are used to implement the functionality associated with various applications, services and features of the social networking system 20. For instance, a messaging application, such as an email application, an instant messaging application, or some hybrid or variation of the two, may be implemented with one or more application server modules 24. A photo sharing application may be implemented with one or more application server modules 24. Similarly, a search engine enabling users to search for and browse member profiles may be implemented with one or more application server modules 24. Of course, other applications and services may be separately embodied in their own application server modules 24. As illustrated in FIG. 1, social networking system 20 may include an event system 300, which is described in more detail below.

Additionally, a third party application(s) 48, executing on a third party server(s) 46, is shown as being communicatively coupled to the social networking system 20 and the client device(s) 50. The third party server(s) 46 may support one or more features or functions on a website hosted by the third party.

Figure 2:
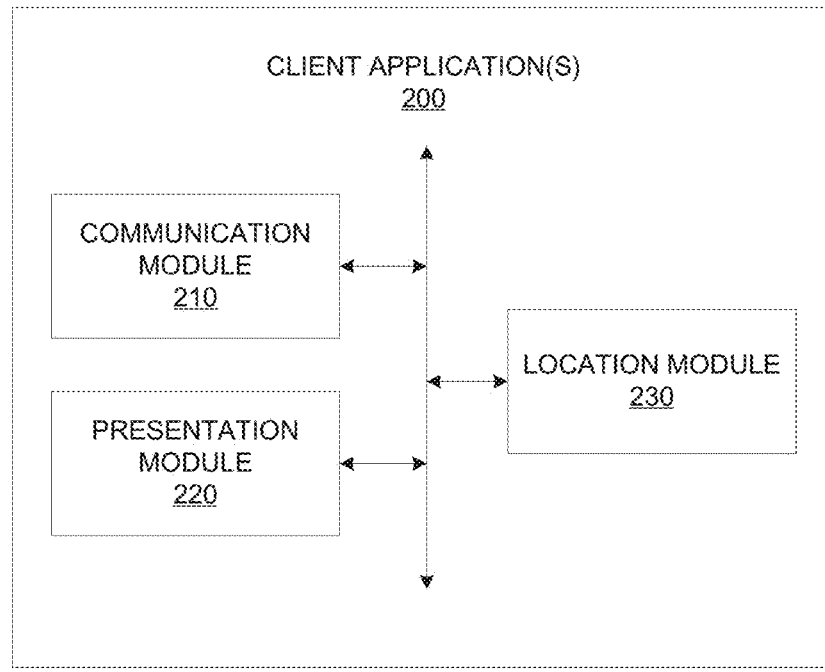
FIG. 2 is a block diagram depicting an example embodiment of a client application.

FIG. 2 illustrates a block diagram showing example components provided within the client application(s) 200. The client applications 200 may include a communication module 210, a presentation module 220, and a location module 230. All of the modules may communicate with each other, for example, via a network coupling, shared memory, and the like. It will be appreciated that each module may be implemented as a single module, combined into other modules, or further subdivided into multiple modules. Other modules not pertinent to example embodiments may also be included, but are not shown.

The communication module 210 may perform various communication functions to facilitate the functionality described herein. For example, the communication module 210 may communicate with the social networking system 20 via the network 40 using a wired or wireless connection. The communication module 210 may also provide various web services functions such as retrieving information from the third party servers 46 and the social networking system 20. Information retrieved by the communication module 210 may include profile data corresponding to the user 60 and other members of the social network service from the social networking system 20.

The presentation module 220 may provide a variety of presentation functionality such as generating user interfaces, interactively presenting user interfaces to the user, receiving information from the user from interactions with user interfaces, and so on. Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth).

The location module 230 may provide various location services functionality. For example, the location module 230 may retrieve location information from one or more location sensing components or devices (e.g., a GPS component, WiFi® triangulation, iBeacons, other indoor positioning systems, and so forth). The location information may represent the real-time location of the client device(s) 50 corresponding to the user. This may be interpreted as the current location of the user. The location information may include information such as timestamps, longitude, latitude, direction of movement, speed of travel, and the like.

Figure 3:
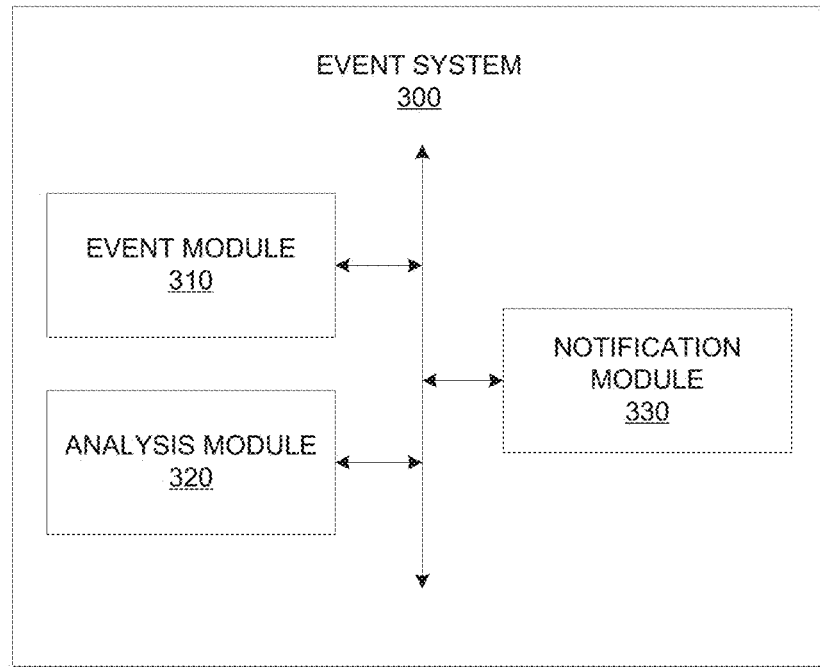
FIG. 3 is a block diagram depicting an example embodiment of an event system.

FIG. 3 illustrates a block diagram showing example components provided within the event system 300. The event system 300 may include an event module 310, an analysis module 320, and a notification module 330. All of the modules may communicate with each other, for example, via a network coupling, shared memory, and the like. It will be appreciated that each module may be implemented as a single module, combined into other modules, or further subdivided into multiple modules. Other modules not pertinent to example embodiments may also be included, but are not shown.

The event module 310 may provide various event related functionality, such as determining the suggested event, retrieving information corresponding to the suggested event, and so on. For example, the event module 310 may determine the suggested event based on the location information of the user. The event module 310 may then retrieve the event information corresponding to the suggested event. Many other event relation functions may be performed by the event module 310.

The analysis module 320 may perform a variety of analyses to facilitate the functionality described herein. For example, the analysis module 320 may identify the contact members of the user, using the social graph data, from among the members of the social network service. The analysis module 320 may identify many other groups of members based on the social graph data, profile data, and other data.

The notification module 330 may provide a variety of user notification functionality such as communicating notifications to the user, communicating notifications to the contact members of the user, causing the presentation of user interfaces to the user, and so on. For example, the notification module 330 may cause presentation of the event information to the user. The notification module 330 may cause the presentation of various user interfaces by communicating instructions for presenting information to a device operable to present information to the user.

Figure 4:
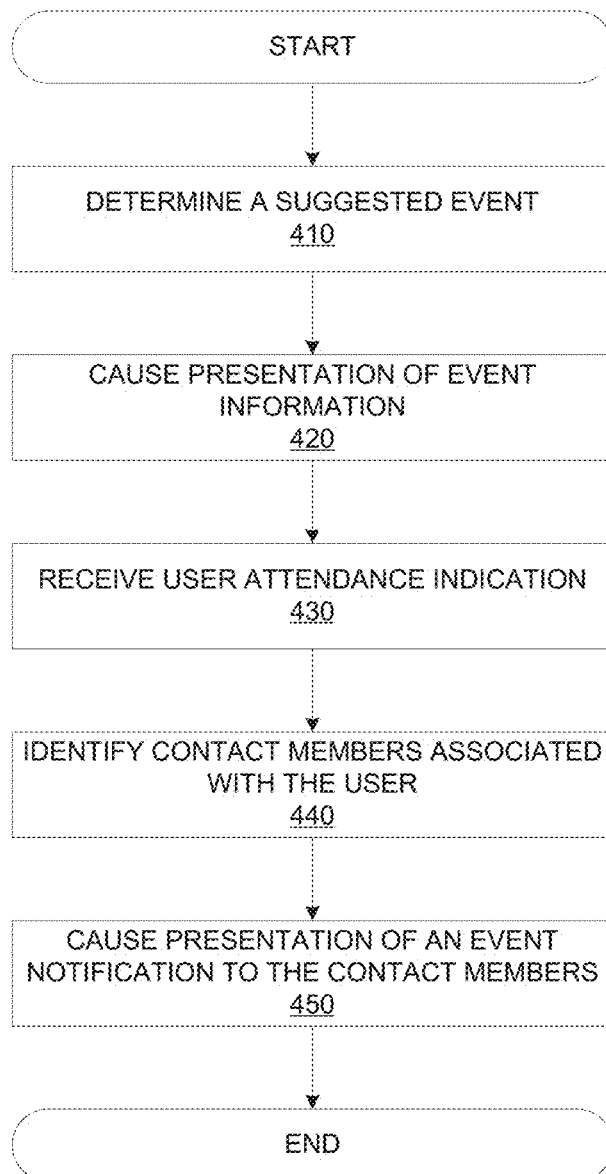
FIG. 4 is a flow diagram illustrating an example method for recommending a suggested event to members of a social network service.

FIG. 4 is a flow diagram illustrating an example embodiment of a method 400 for determining the suggested event or the suggested events. At operation 410, the event module 310 may determine the suggested event based on the location information of the user. The suggested events may be identified from among a wide variety of events such as a developer conference, a sporting event, a concert, and so on. The events may be accessed from a number of sources. For example, events may be retrieved from the third party servers 46, from the social networking system 20, and from other sources. In some example embodiments, the events may be generated by the members of the social network service. The event information corresponding to the events may be retrieved and used to determine the suggested event.

Figure 9:
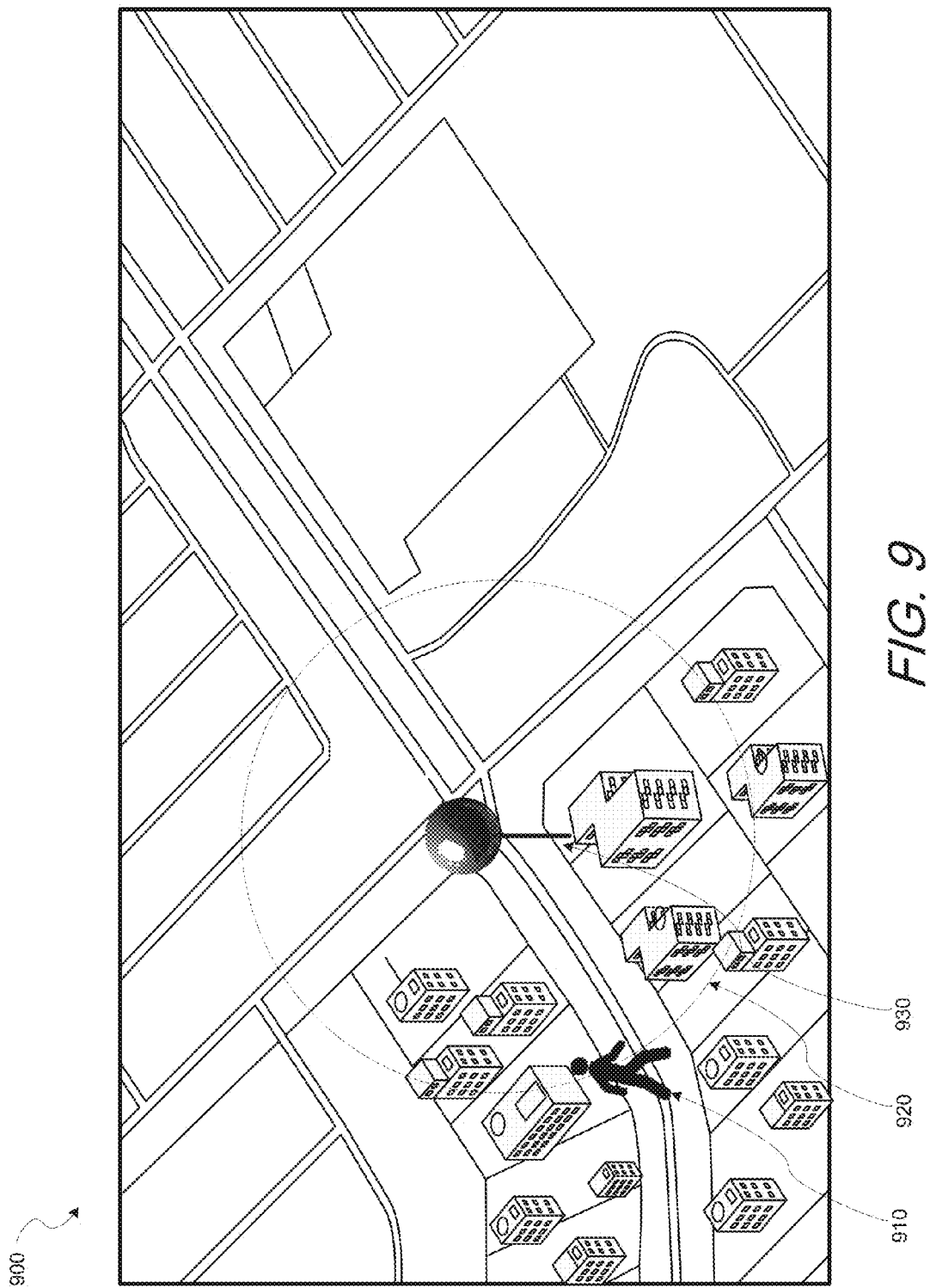
FIG. 9 depicts an example of using geographic information to determine suggested events.

In an example embodiment, events that are within a distance of the user may be identified and recommended to the user as further depicted in FIG. 9. In this example embodiment, the distance may be a user-specified distance. For example, the current location of the user may be determined by a GPS component of a device of the user. The events having a location that is within a distance of the current location of the user may be identified and included in the suggested events.

In an alternative example embodiment, past locations of the user may be used to identify suggested events. For example, the location of the user may be stored over time. Frequently visited locations of the user may be used to determine suggested events.

In further example embodiments, the suggested events may be identified based on an analysis of the profile data of the user. The profile data of the user may include information such as skills, education, interests, posts, and so on. For instance, the user may have indicated a skill in Java programming. The event module 310 may identify events that may be of interest to Java programmers (e.g., events that include the keyword Java in the title or description may be identified). Many schemes and techniques may be employed to identify the suggested event based on the profile data of the user.

In still further example embodiments, the suggested events may be identified based on user social graph data. The user social graph data may include relationships between members of the social network service such as the contact members of the user. The user social graph data may be used to identify suggested events by, for example, identifying events that the contact members of the user are attending or have attended in the past. Many schemes and techniques may be employed to identify suggested events based on the user social graph data.

In yet further example embodiments, the user may specify event criteria used to identify suggested events. The user-specified event criteria may include a wide range of criteria such as event types, keywords, event times, event locations, event attendees, and so on. In an example embodiment, the event module 310 may cause presentation of a user interface configured to receive the user-specified event criteria. For example, the user may be interested in sporting events and the user may have provided the event module 310 with the types of sporting events of interest. The event module 310 may then identify the suggested events that are of the same or a similar event type to the user-specified event type. Many schemes and techniques may be employed to identify suggested events based on the user-specified event criteria.

Figure 10:
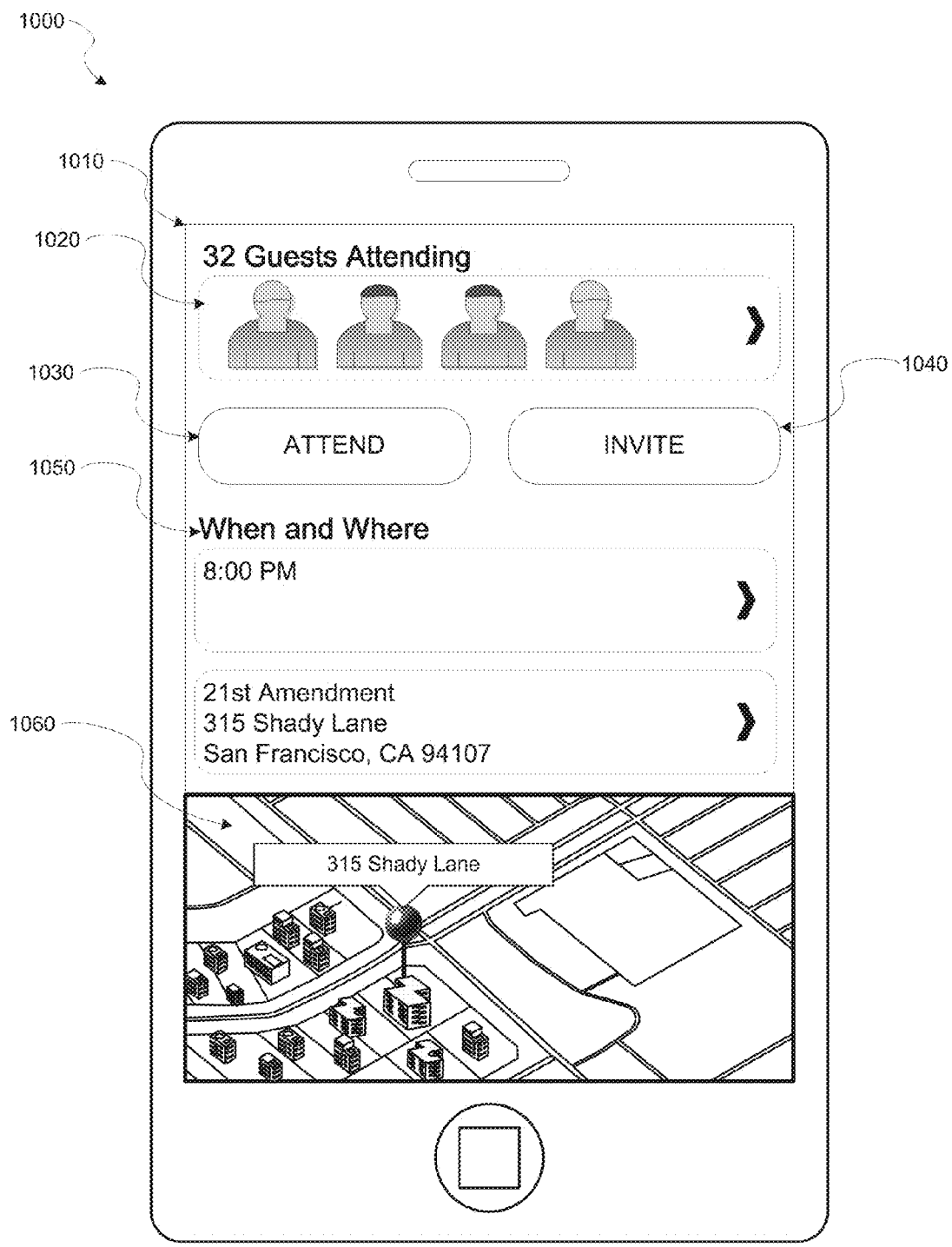
FIGS. 10 and 11 depict examples of user interfaces for presenting event information to the user.
Figure 11:
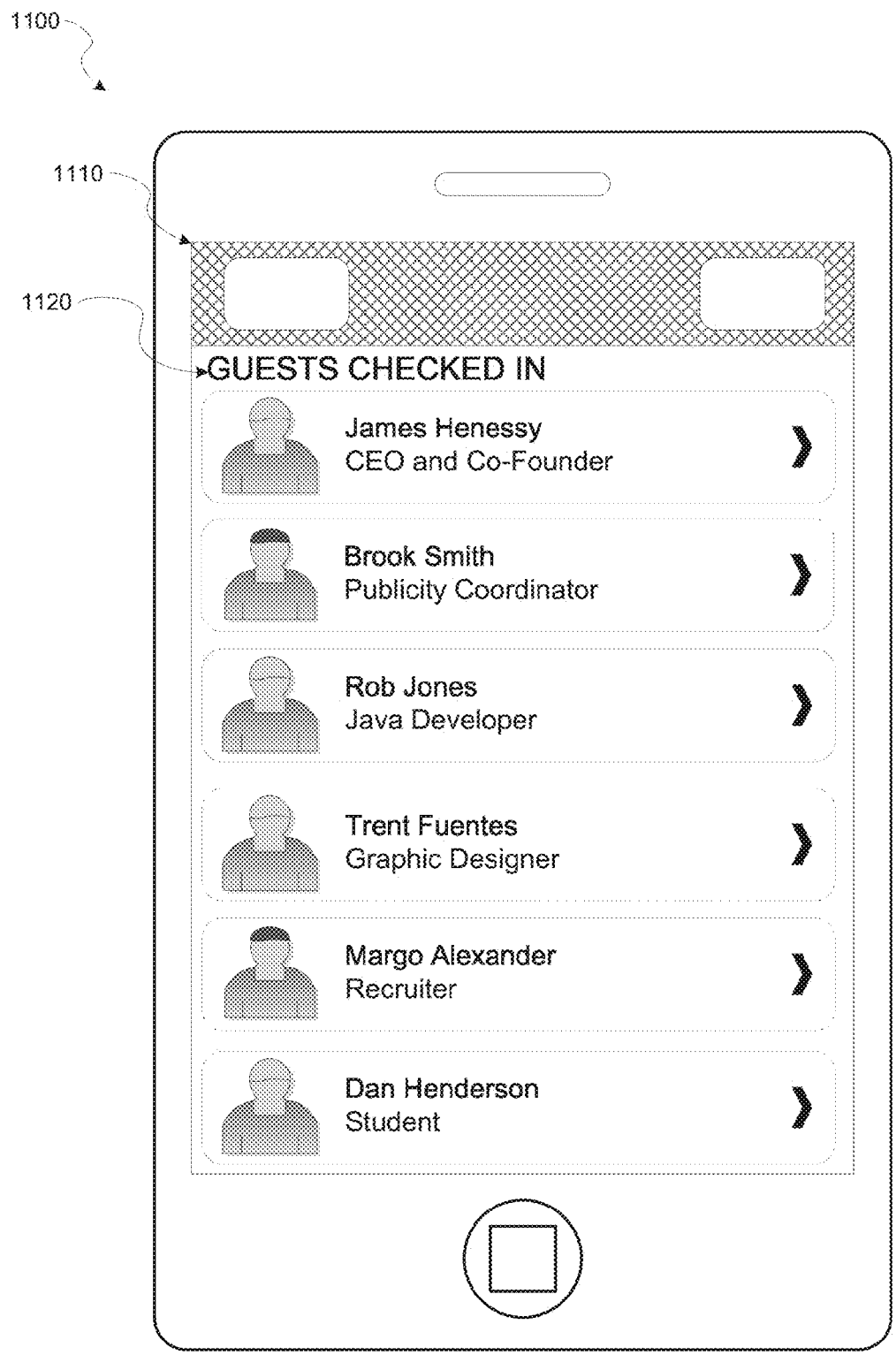

Referring back to FIG. 4, at operation 420, the notification module 330 may cause presentation of the event information that corresponds to the suggested event to the user. The event information may include a variety of information such as an event description (e.g., event name, event location, event topic, event speakers, event activities, event duration, event price, and so forth), number of event attendees, a list of event attendees, an attendee summary, the contact members of the user attending the event (as further described in FIG. 6), other event information (event parking, public transportation options, handicap accessible, weather forecast for the event location and time), and so on. The event information may be retrieved from a variety of sources such as the third party servers 46, the social networking system 29, and other sources. The user may be notified of the suggested events, for example, using a push notification that displays a message with at least a portion of the event information corresponding to the suggested event. The user may be notified of the suggested event using other means, such as an in-app notification, email, posts to a social network service profile, text message, and so forth. In various example embodiments, the user may access more detailed event information as depicted in FIGS. 10 and 11.

In some example embodiments, the analysis module 320 may generate an attendee summary based on an analysis of the profile data of the attendee members. The event information may include the attendee summary and may be presented to the user. For example, a particular event may be popular with certain members of the social network with a particular background. For instance, a game developer conference may be popular with Java developers. The analysis module 320 may analyze the profile data of the attendee members and identify that there are many Java developers at the conference. The attendee summary may indicate that there are many Java developers at the game developer conference. This information may be useful to the user in deciding whether to attend the suggested event. Many schemes and techniques may be employed to generate the attendee summary that may include a wide variety of information.

In further example embodiments, the event module 310 may facilitate admittance to the suggested event for the user. For example, if the suggested event requires a ticket, the event module 310 may provide a means for acquiring the ticket (e.g., a link to a webpage where the ticket may be purchased). The event module 310 may also provide parking information, optimal travel routes, public transportation options, and so on, to facilitate the user attending the suggested event.

Figure 12:
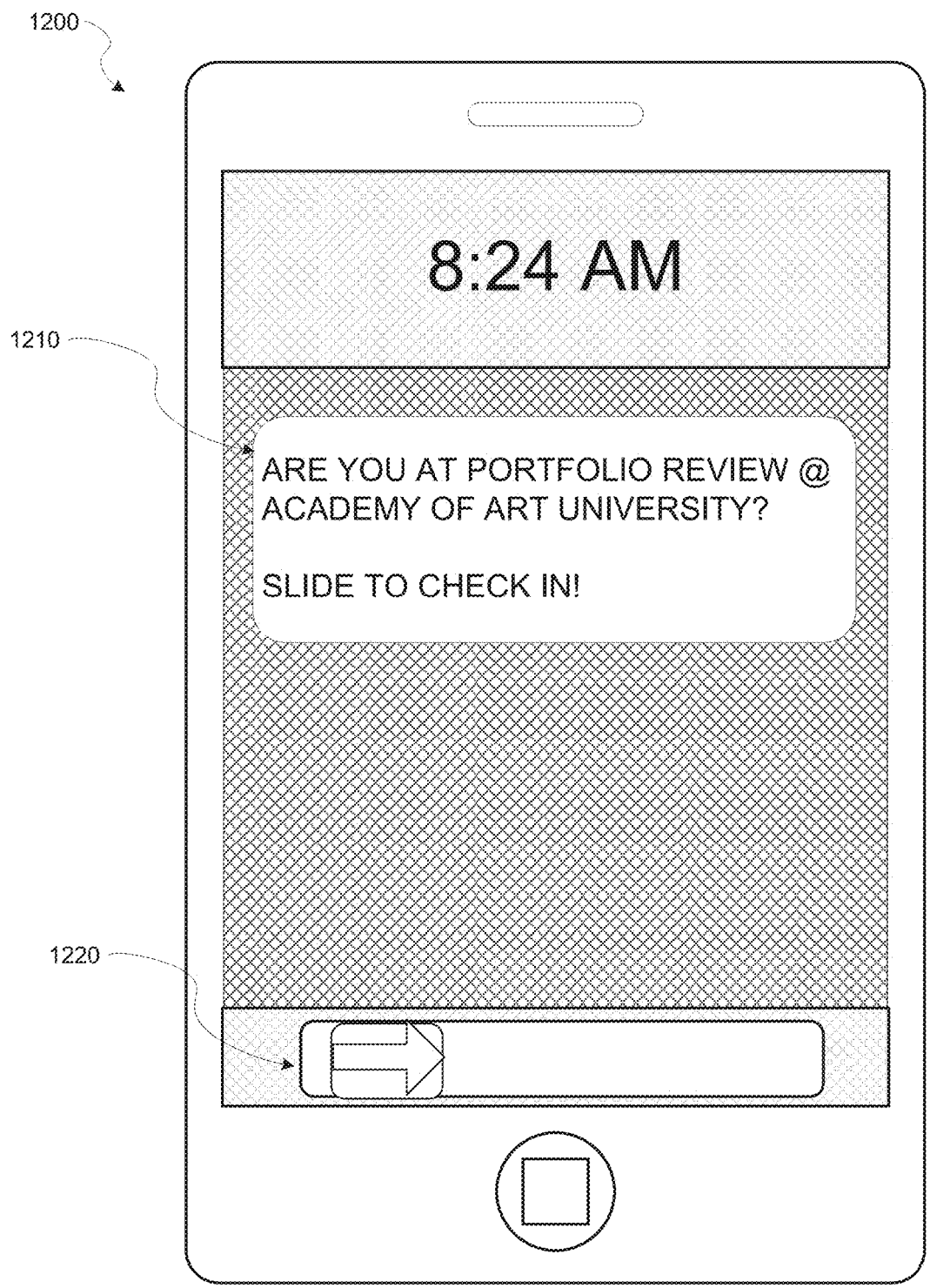
FIGS. 12 and 13 depict examples of user interfaces for presenting various notifications to the user.

At operation 430 in FIG. 4, the event module 310 may receive the user attendance indication from the user. The user attendance indication (also referred to as "check-in") may indicate that the user is attending the suggested event. The event module 310 may store the user attendance indication, and attendance indications from other members of the social network service, for use in the future. The attendance indications may be stored, for example, in the database 32. In various example embodiments, the user may provide attendance indications for other members of the social network service, such as the contact members of the user (e.g., the user may be attending the suggested event with a group of contact members and may provide a check-in for the entire group). In some example embodiments, the user attendance indication may be received via user input. For instance, the notification module 330 may query whether the user is attending the suggested event by causing presentation of a user interface configured to receive the user attendance indication (as depicted in FIG. 12).

In alternative embodiments, the user attendance indication may be received in response to the attendance trigger. In some instances, the attendance trigger may automatically provide the user attendance indication to the event module 310, and in other instances, the attendance trigger may query the user as to whether the user is attending the suggested event (as depicting in FIG. 12). Many different types of triggers may be employed. For example, the user may trigger communication of the user attendance indication by moving within a trigger distance of the suggested event (e.g., the user goes to the suggested event and the current location of the user, as determined by a GPS component of a mobile device of the user, indicates that the user is near the event or inside the building hosting the suggested event). The trigger distance may be a predetermined distance that is sufficient to indicate that the user is attending the event (e.g., a distance smaller than the size of the event building). In another example embodiment, the user may trigger the communication of the user attendance indication by moving within a trigger boundary surrounding the suggested event (e.g., the boundary may correspond to the boundary of the building or other location of the suggested event). In other example embodiments, communication of the user attendance indication may be triggered by a NFC component of the client device 50 of the user communicating with an iBeacon located at the suggested event. In a furthe example embodiment, communication of the user attendance indication may be triggered by the NFC component of the client device 50 of the user communicating with another device of a member of the social network service that is attending the suggested event. In still further example embodiments, communication of the user attendance indication may be triggered by the user scanning a quick response (QR) code located at the suggested event. Many varieties of triggering mechanisms may be employed to trigger communication of the user attendance indication.

In further example embodiments, the user may provide a departure indication, received at the event module 310, that indicates the user has left the suggested event. The departure indication may be stored, for example, in database 32. The departure indication may help provide accurate information about the number of attendees currently at the suggested event (this information may be useful to other users in deciding whether to attend the suggested event). Member departure indications, similar to the departure indication, may be received from members of the social network service and stored in database 32, for example. In some example embodiments, the departure indication may be received in response to a departure trigger. In some instances, the departure trigger may automatically provide the user departure indication to the event module 310, and in other instances, the departure trigger may query the user as to whether the user is departing the suggested event. Similar to the attendance trigger, many different types of triggers may be employed for the departure trigger. For example, the departure trigger may be location based triggers (e.g., based on location as determined by a GPS component of a mobile device), NFC triggers (e.g., iBeacon), time triggers, and so on.

At operation 440 in FIG. 4, the analysis module 320 may identify the contact members from among members of the social network service that are associated with the user. The contact members of the user may have a relationship with the user on the social network service (e.g., friends or follower). The contact members of the user may be identified using the social graph data. The analysis module 320 may identify the contact members by accessing the user social graph data corresponding to the user.

Figure 13:
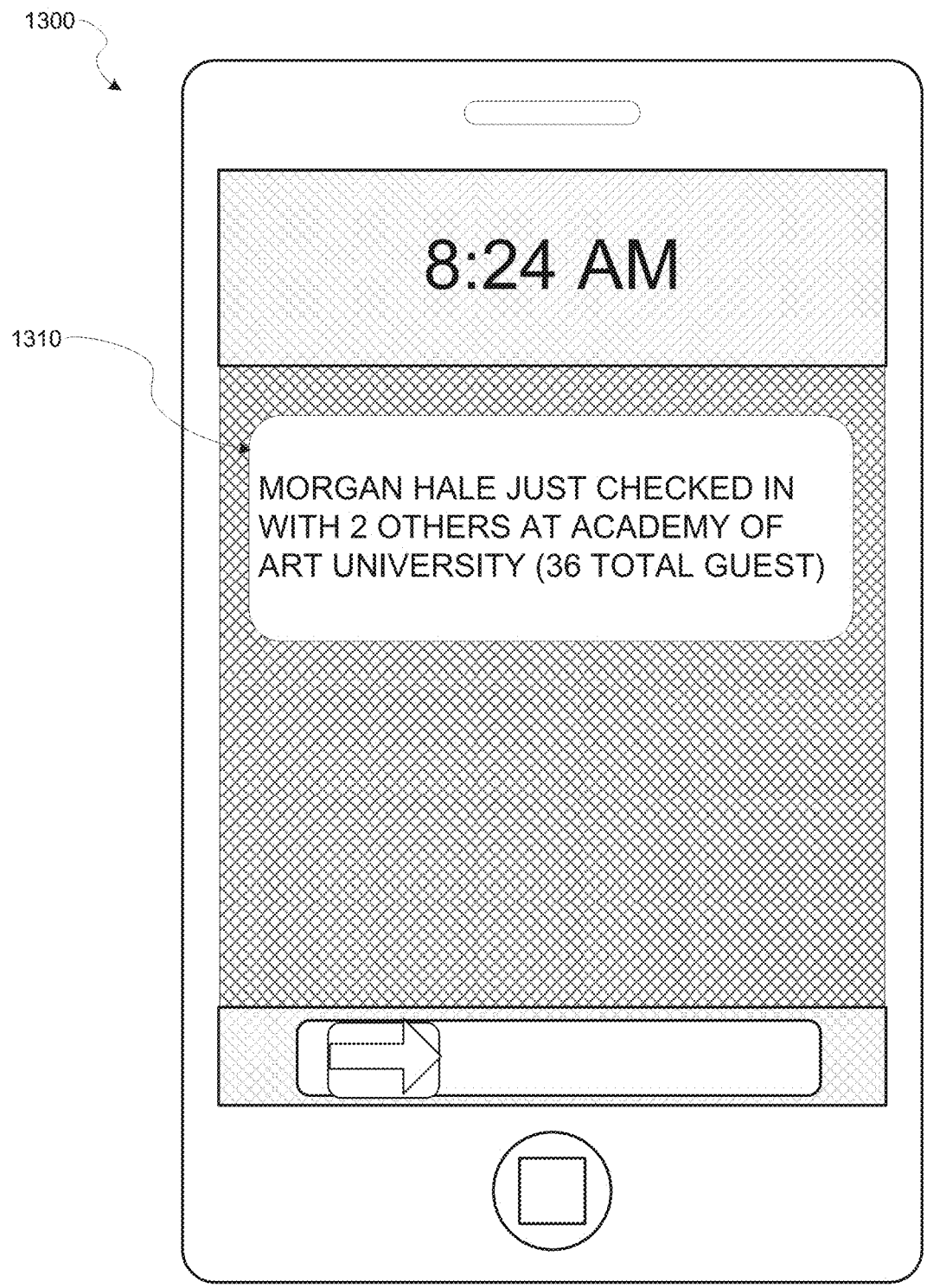

At operation 450, the notification module 330 may cause the presentation of an event notification to the contact members of the user. The event notification may include the user attendance indication. For example, the event notification may be a push notification to the client devices of the contact members as depicted in FIG. 13. In some example embodiments, the event notification may only be provided to the contact members within a distance of the suggested event (e.g., only nearby contact members may receive the event notification). In further example embodiments, the event notification may include at least a portion of the event information as depicted in FIG. 13 (e.g., a basic description or title of the suggested event and the number of contact members attending).

The event notification may be useful to the contact members as it may put the contact members on notice of the attendance of the user to the suggested event (e.g., the contact members may wish to physically meet the user and will be notified of the user's arrival at the suggested event via the event notification and may begin physically seeking the user). In further example embodiments, the event system 300 may facilitate the physical meeting of the user and the attending contact members at the suggested event. For example, a messages may be communicated between the attending contact members and the user, more detailed location information relating to the user and the attending contact members may be exchanged to assist in a physical meeting (e.g., a real time distance to contact members at the suggested event), and so on.

Figure 7:
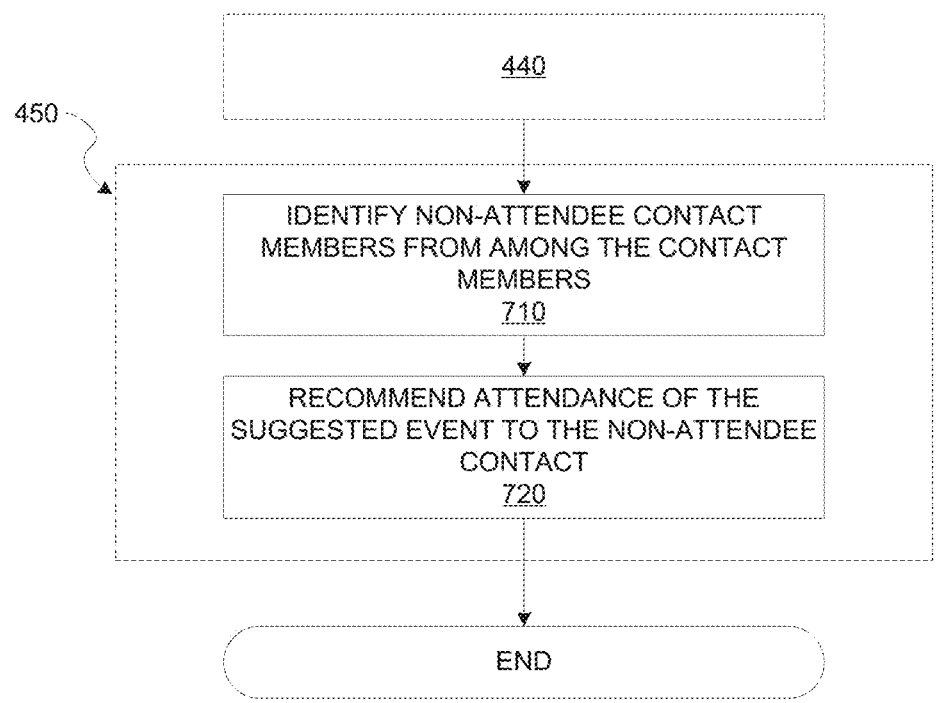

For contact members of the user not attending the suggested event, the event notification may provide awareness of the suggested event and recommend attendance of the suggested event as further described in FIG. 7. In addition, if a particular non-attending contact member decides to attend the suggested event, further contact members of the particular contact member may be provided the event notification spreading further awareness of the event. In this way, awareness of the suggested event may spread via social contacts.

Figure 5:
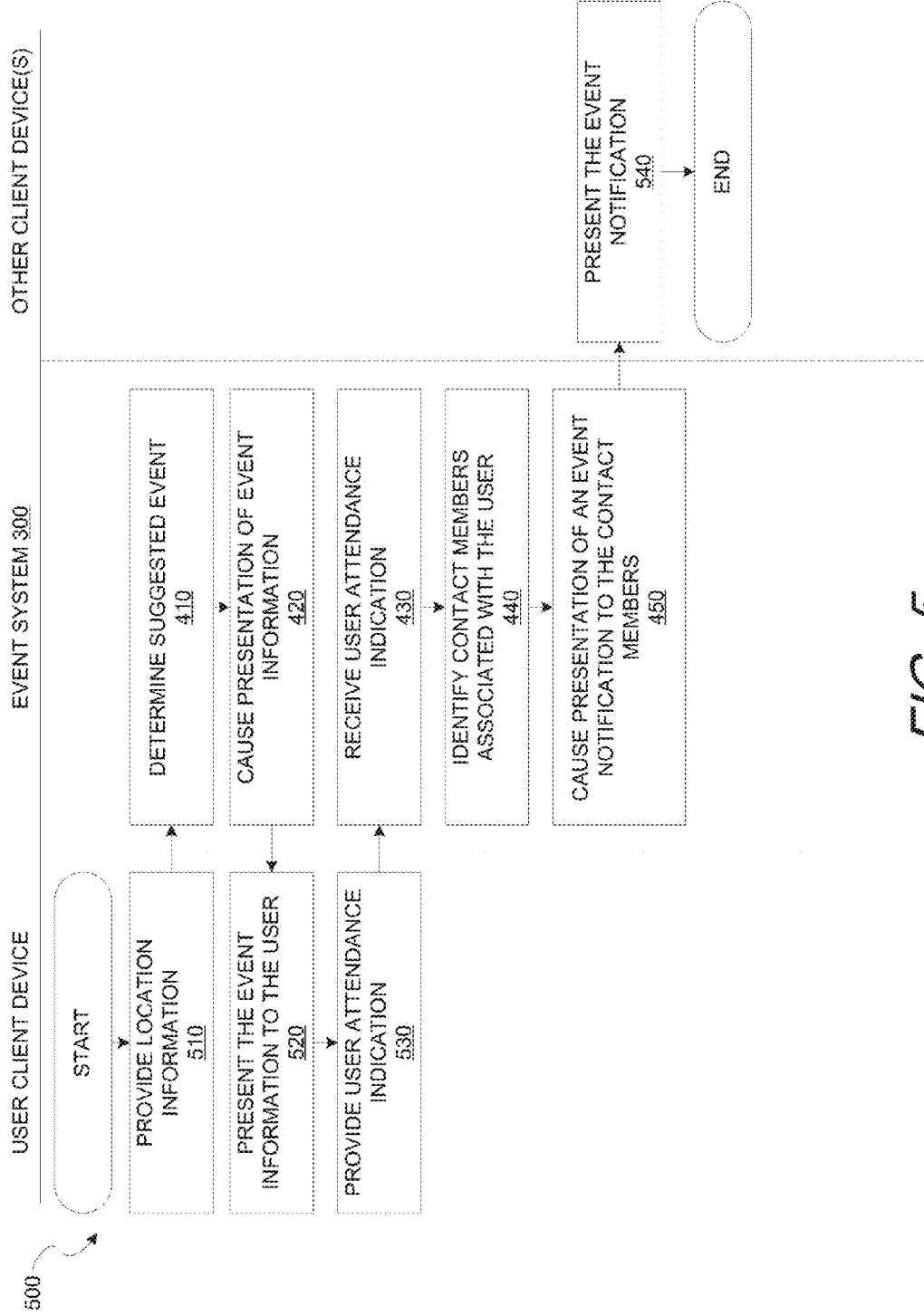
FIG. 5 is a flow diagram illustrating the interaction between various devices in accordance with example embodiments.

FIG. 5 is a flow diagram illustrating the interaction between various devices in accordance with example embodiments. The devices may include a user client device, the event system 300, and other client devices. The user client device may be a device of the user and the other client devices may be devices of members of the social network service.

At operation 510, the user client device may provide location information to the event system 300. For instance, the location information may be provided by the location module 230 (e.g., as determined by a GPS component of a mobile device) and communicated using the communication module 210 of the client application(s) 200.

At the operation 410, the event system 300 may receive the location information of the user and determine the suggested events based on the location information as described above.

At the operation 420, the event system 300 may then cause presentation of the event information by communicating the event information to the user client device, the user client device operable to present the event information to the user.

At operation 520, the user client device may receive the event information and present the event information to the user (e.g., displaying the event information on a mobile device display).

At operation 530, the user client device may provide the user attendance indication to the event system 300. For example, the user client device may present a user interface configured to receive the user attendance indication from the user and the user may interact with the user interface to provide the user attendance indication (e.g., the user taps a button to indicate that the user is attending the suggested event).

At the operation 430, the event system 300 may receive the user attendance indication as described above.

At the operation 440, the event system 300 may identify the contact members associated with the user as described above.

At the operation 450, the event system 300 may cause presentation of the event notification to the contact members as describe above.

At the operation 540, the other client devices (e.g., of the contact members) may receive the event notification and present the event notification. For example, the event notification may be presented using a push notification to the other client devices as depicted in FIG. 13.

Figure 6:
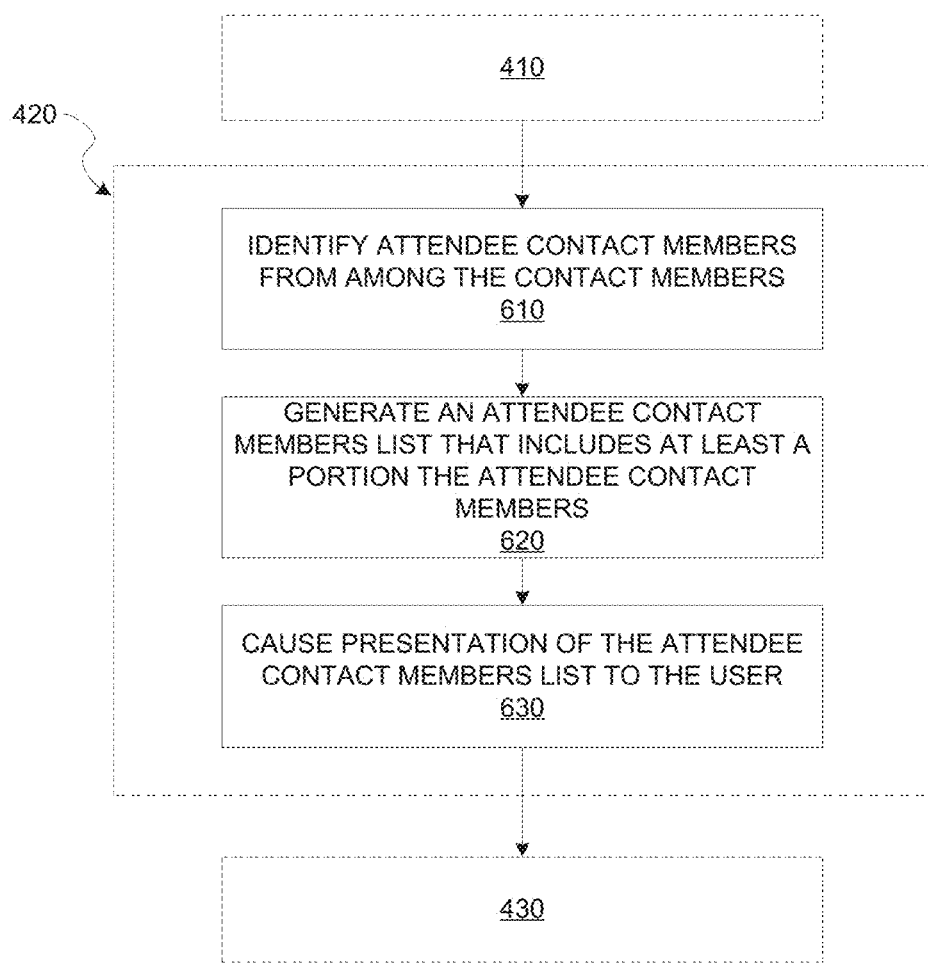
FIGS. 6 and 7 are flow diagrams further illustrating an example method for recommending a suggested event to members of a social network service.

FIG. 6 is a flow diagram depicting further example operations for recommending the suggested event to the members of the social network service (see operation 420 in FIG. 4). In further example embodiments, the operation 420 may include identifying attendee contact members, generating an attendee contact list including at least a portion of the attendee contact members, and causing presentation of the attendee contact list to the user. Providing the contact members of the user that are attending the suggested event (attendee contact members) may assist the user in deciding whether to attend the suggested event. For instance, if the user has numerous contacts at the suggested event, the user may be more likely to attend the suggested event.

At operation 610, the analysis module 320 may identify the attendee contact members from among the contact members. The contact members may be identified from among the members of the social network service using the social graph data. The attendee contact members may be identified from among the contact members based on member attendance indications. Each of the member attendance indications may indicate a member of the social network service is attending the suggested event. The member attendance indications are similar to the user attendance indication but for other members of the social network service. The member attendance indications may be received from the members of the social network service in a similar manner to the user attendance indication.

At operation 620, the analysis module 320 may generate the attendee contact list that includes at least a portion of the attendee contact members. In some example embodiments, the attendee contact list may include all of the attendee contact members. In other example embodiments, the attendee contact members included in the attendee contact list may be based on an analysis of information stored in a profile of the user and information stored in profiles of the attendee members. For instance, the attendee contact members with similar skills and interests to the user, as determined by an analysis of profile data of the user and profile data of the attendee contact members, may be included in the attendee contact list. Many schemes and techniques may be employed to identify attendee contact members to include in the attendee contact list.

At operation 630, the notification module 330 may cause presentation of the attendee contact list to the user. For example, the attendee contact list may be included in the event information at the operation 420 in FIG. 4. The notification module 330 may cause presentation of the attendee contact list by communicating the attendee contact list to the client device(s) 50 with instructions to present the attendee contact list, the client device(s) 50 being operable to present the attendee contact list to the user.

FIG. 7 is a flow diagram depicting further example operations for recommending the suggested event to the members of the social network service (see operation 450 in FIG. 4). In further example embodiments, the operation 450 may cause the presentation of an event notification to the contact members of the user.

At operation 710, the analysis module 320 may identify non-attendee contact members from among the contact members. Similar to the operation 610, the contact members may be identified from among the members of the social network service using the social graph data. The non-attendee contact members may be identified from among the contact members based on the member attendance indications. A contact member that did not provide a member attendance indication, associated with the suggested event, may be identified as a non-attendee contact member.

At operation 720, the event module 310 may recommend attendance of the suggested event to the non-attendee contact members. For example, the event notification may include a recommendation to attend the suggested event. The recommendation may include the event information and may facilitate attendance of the suggested event as describe above.

In further example embodiments, only non-attendee contact members within a distance of the suggested event may be recommended attendance of the suggested event. In other words, the non-attendee contact members that are nearby the suggested event may be recommended attendance of the suggest event while the non-attendee contact members that are not near the suggested event may not be recommended attendance of the suggested event.

Figure 8:
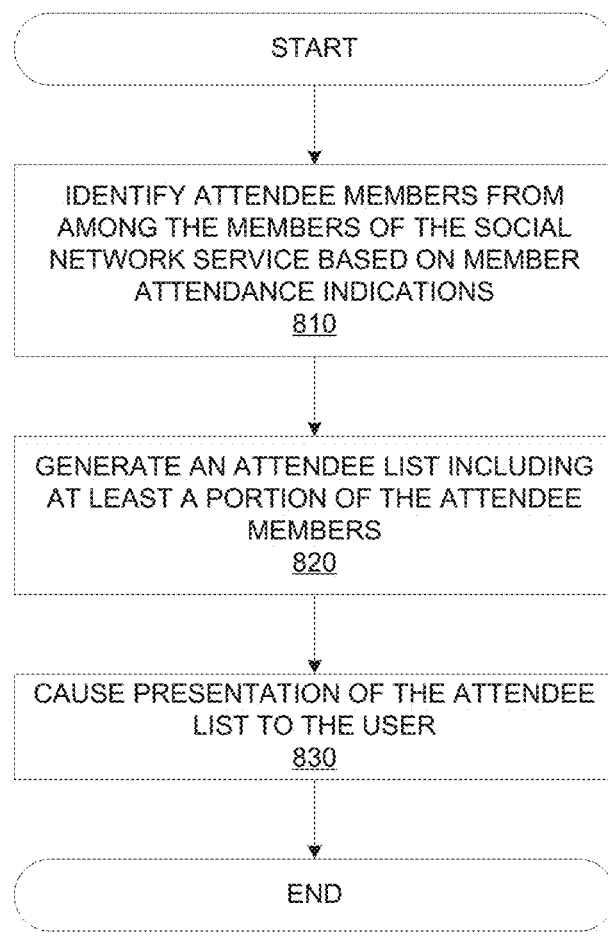
FIG. 8 is a flow diagram illustrating an example method for generating an attendee list and causing the presentation of the attendee list to the user.

FIG. 8 is a flow diagram illustrating an example method for generating the attendee list and causing presentation of the attendee list to the user. The attendee list may be useful to the user for various reasons. If the user receives the attendee list prior to attending the suggested event, the attendee list may assist the user in deciding whether to attend the suggested event (e.g., if the attendee list includes members the user may be interested in meeting or members with similar interests and skills, the user may be more likely to attend the suggested event). If the user receives the attendee list after the suggested event, the attendee list may assist the user in making a connection with the attendee members after the suggested event. For example, if the user meets a member at the suggested event and later would like to make a connection with that person through the social network service, the attendee list may simplify that task for the user. In another scenario, the user may have missed meeting someone at the suggested event and may be able to communicate with that person after the suggested event. Providing the attendee list to the user may provide many other benefits to the user.

At operation 810, the analysis module 320 may identify attendee members from among the members of the social network service based on the member attendance indications. As described above, each indication of the member attendance indications may indicate that a member of the social network service is attending the suggested event.

At operation 820, the analysis module 320 may generate the attendee list that includes at least a portion of the attendee members. In some example embodiments, the attendee list may not include attendee members that are contact members of the user (the reasoning being that the user is already connected with contact members through the social network service and would not need to connect with those members). The attendee members may be included in the attendee list based on an analysis of profile data of the user and profile data of the attendee members. The purpose of the analysis may be to identify attendee members the user may be interested in connecting with through the social network service. For example, the attendee members with similar attributes, skills, and/or interests to the user, as determined by an analysis of profile data of the user and profile data of the attendee members, may be included in the attendee list. Many schemes and techniques may be employed to identify attendee members to include in the attendee list.

At operation 830, the event module 310 may cause presentation of the attendee list to the user. Various information associated with each member included in the attendee list may also be presented to the user (e.g., images of the member, name, current job title, educational background, and so on). In various example embodiments, the attendee list may be included in the event information at the operation 420 in FIG. 4. In another example embodiment, the event notification at the operation 450 in FIG. 4 may comprise the event information including the attendee list. The notification module 330 may cause presentation by communicating the attendee list to the client device(s) 50 with instructions to present the attendee list, the client device(s) 50 being operable to present the attendee list to the user.

Figure 14:
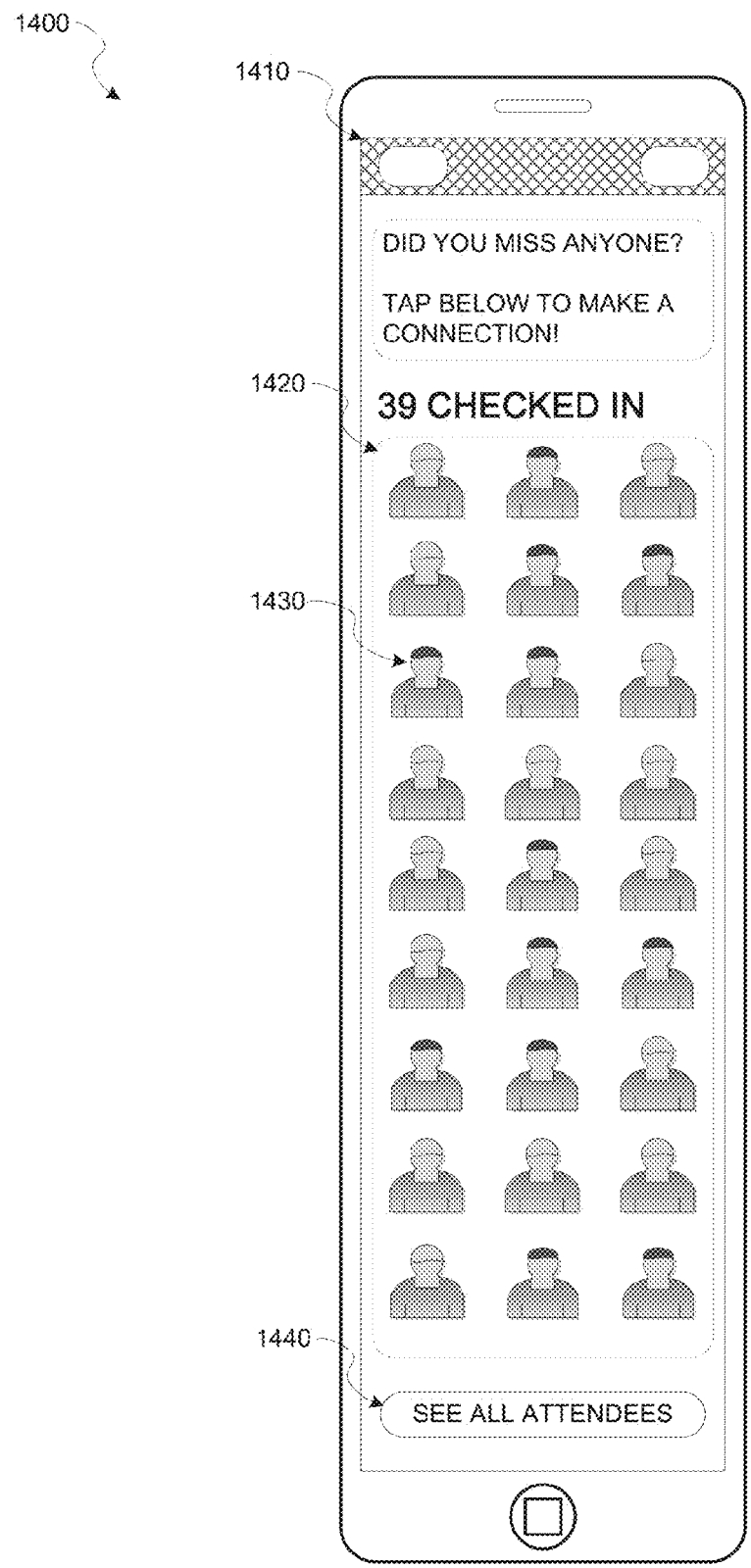
FIG. 14 depicts an example user interface for presenting an attendee list to the user.

In further example embodiments, the notification module 330 may provide the attendee list to the user after the suggested event has ended, as further depicted in FIG. 14. For example, an email that includes the attendee list may be communicated to the user following the suggested event. In another example, the attendee list may be provided via a website (e.g., a user interface configured to display the attendee list). Providing the attendee list to the user after the suggested event may assist the user in making social network connections based on interactions at the suggested event. The event module 310 may facilitate the user connecting with the attendee members through the social network service. For example, the email that may include the attendee list may provide a means for forming a relationship between the user and a particular attendee member included in the attendee list. In this example, the email may include a link, or similar means, that the user may activate to firm a relationship with a particular attendee member included in the attendee list. Many other schemes and techniques may be employed to facilitate the connecting of the user with the attendee members included in the attendee list.

FIG. 9 depicts an example illustration of using geographic information to determine suggested events. The illustration in FIG. 9 is merely for example and is in no way limiting. The map 900 depicts a city with a location 930. The location 930 may be a location of the suggested event. The person 910 may be the user (e.g., user 60) with the client device(s) 50 (e.g., a mobile device) that includes a GPS component operable to determine the location information of the user that includes current location. in this illustration, the distance 920 may represent a distance from the location 930. As described above, if the person 910 is within the distance 920, the suggested event at location 930 may be recommended to the person 910. If the person 910 is outside of the distance 920, the suggested event at location 930 may not be recommended to the person 910. Although this illustration depicts only one event location and one event, multiple events may be determined to be within a distance of the user and recommended to the user.

FIG. 10 depicts an example user interface for presenting the event information to the user. Example device 1000 may be a mobile device or other device operable to present information to the user. The example user interface 1010 may include various user interface elements to convey information to the user (e.g., text and images). In this example, the example user interface 1010 may include portions of or all of the event information.

User interface element 1020 may include images and information corresponding to members of the social network service. For example the user interface element 1020 may display profile data corresponding to members from the attendee list, members from the attendee contact list, and other members. The profile data may include member images, names, and other information. The profile data may be accessed from the social networking system 20. Activating the user interface element 1020 may present additional information associated with the members as depicted in FIG. 11.

User interface element 1030 may provide the user attendance indication to the event system 300. For example, activating the user interface element 1030 may send the user attendance indication to the event system 300 as described above in the operation 430. User interface element 1040 may allow the user to invite other members to the suggested event. For example, activating user interface element 1040 may send the event notification to a user selection of members of the social network service. User interface element 1050 may display portions of the event information associated with the suggested event. In this example, the event information may include information such as where the event is located and when the event is occurring. User interface element 1060 depicts a map showing the suggested event location that may be included in the event information, FIG. 10 merely depicts an example for displaying event information and it is to be appreciated that many possible user interface configurations and styles with various information may be presented to the user in accordance with this disclosure.

FIG. 11 depicts an example user interface for presenting the event information to the user. Example device 1100 may be a mobile device or other device operable to present information to the user. In this example, the example user interface 1110 may include additional information associated with the attendee contact members or the attendee members included in the event information. The user interface element 1120 depicts various information about members including name, picture, and job title that may have been retrieved from the profile data corresponding to each member. In this example, the member displayed in the user interface element 1120 may have provided an attendance indication to the suggested event. This information may be useful to the user when deciding whether to attend the suggested event.

FIG. 12 depicts an example user interface for presenting a notification to the user. Example device 1200 may display a notification 1210 to the user. In this example the notification 1210 may query whether the user would like to provide the user attendance indication. As described above, the notification 1210 may be triggered (the attendance trigger) in response to the user moving within a distance of the suggested event, for example. In this example, the user may simply slide the slider 1220 to provide the user attendance indication although a variety of other device interactions may also be employed.

FIG. 13 depicts another example user interface for presenting a notification to the user. Example device 1300 may display a notification 1310 to the user. In this example the notification 1310 may be the event notification. The notification 1310 may include a portion of or all of the event information. In this example, the notification 1310 may indicate that a contact of the user is attending the suggested event. This information may be useful to the user to decide whether to attend the suggested event or seek more information related to the suggested event.

FIG. 14 depicts an example user interface for presenting an attendee list to the user. The example device 1400 may display an example user interface 1410. The example user interface 1410 may include a portion of or all of the event information and a portion of or the entire attendee list. The example user interface 1410 may be presented to the user after the suggested event has ended to facilitate the user connecting with the attendee members of the social network service. In this example, the user interface element 1420 may include information about the attendee member, such as an image, name, job title, and so on. The image may assist the user in identifying the attendee members the user interacted with during the suggested event and would like to connect with through the social network service. In some example embodiments, user interface element 1430 may be activated by the user to form a relationship with the attendee member and the user through the social network service. User interface element 1440 may be activated by the user to provide additional information about the attendee members and the suggested event.

Figure 15:
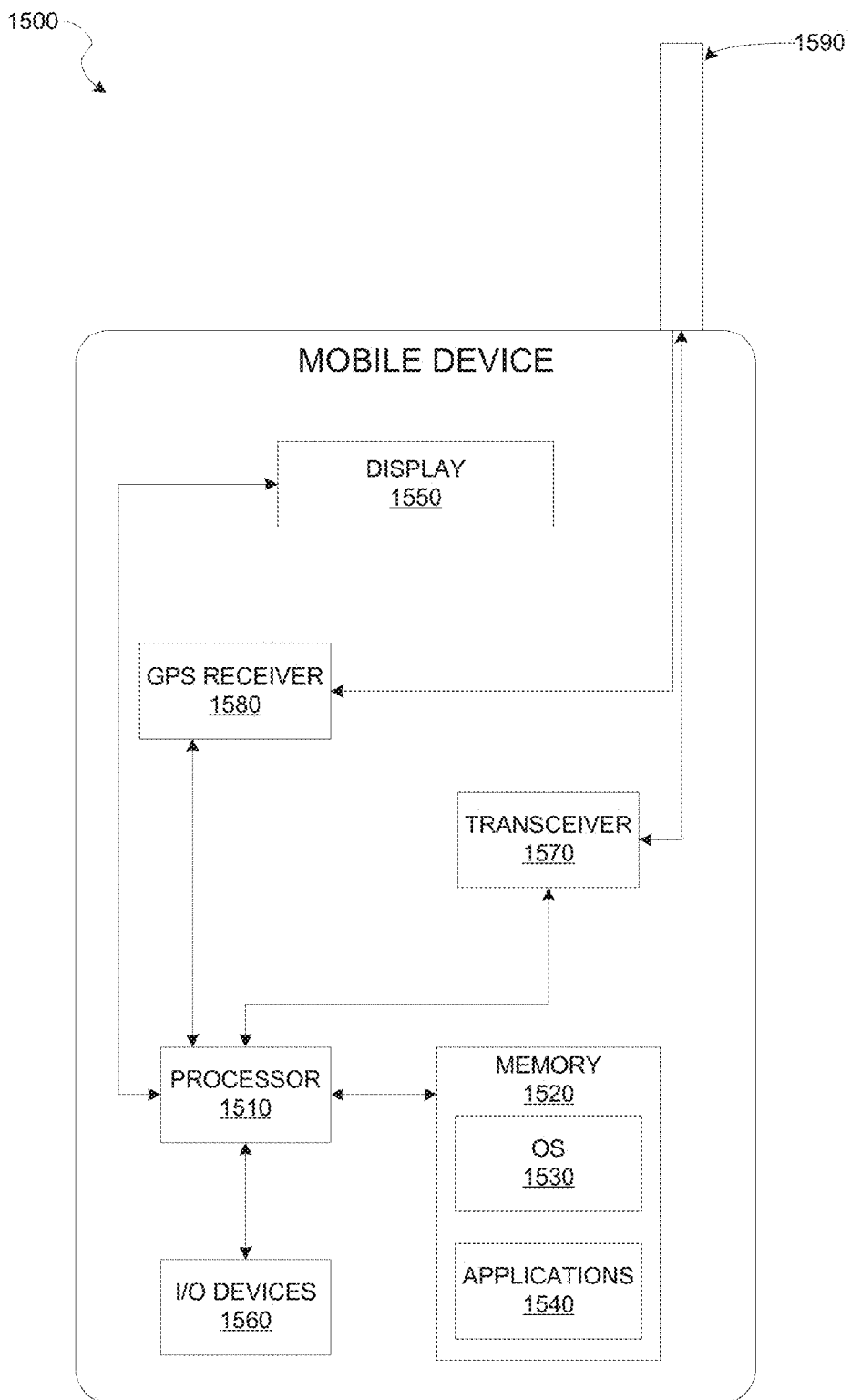
FIG. 15 is a block diagram illustrating a mobile device, according to an example embodiment.

FIG. 15 is a block diagram illustrating a mobile device 1500, according to an example embodiment. The mobile device 1500 may include a processor 1510. The processor 1510 may be any of a variety of different types of commercially available processors suitable for mobile devices (e.g., an XScale architecture microprocessor, a Microprocessor without Interlocked Pipeline Stages (MIPS) architecture processor, or another type of processor). A memory 1520, such as a random access memory (RAM), a Flash memory, or other type of memory, is typically accessible to the processor 1510. The memory 1520 may be adapted to store an operating system (OS) 1530, as well as application programs 1540, such as a mobile location enabled application that may provide location based services (LBSs) to a user. The processor 1510 may be coupled, either directly or via appropriate intermediary hardware, to a display 1550 and to one or more input/output (I/O) devices 1560, such as a keypad, a touch panel sensor, a microphone, and the like. Similarly, in some embodiments, the processor 1510 may be coupled to a transceiver 1570 that interfaces with an antenna 1590. The transceiver 1570 may be configured to both transmit and receive cellular network signals, wireless data signals, or other types of signals via the antenna 1590, depending on the nature of the mobile device 1500. In this manner, a connection with a network such as network 40 of FIG. 1 may be established. Further, in some configurations, a GPS receiver 1580 may also make use of the antenna 1590 to receive GPS signals.

MODULES, COMPONENTS, AND LOGIC

Figure 16:
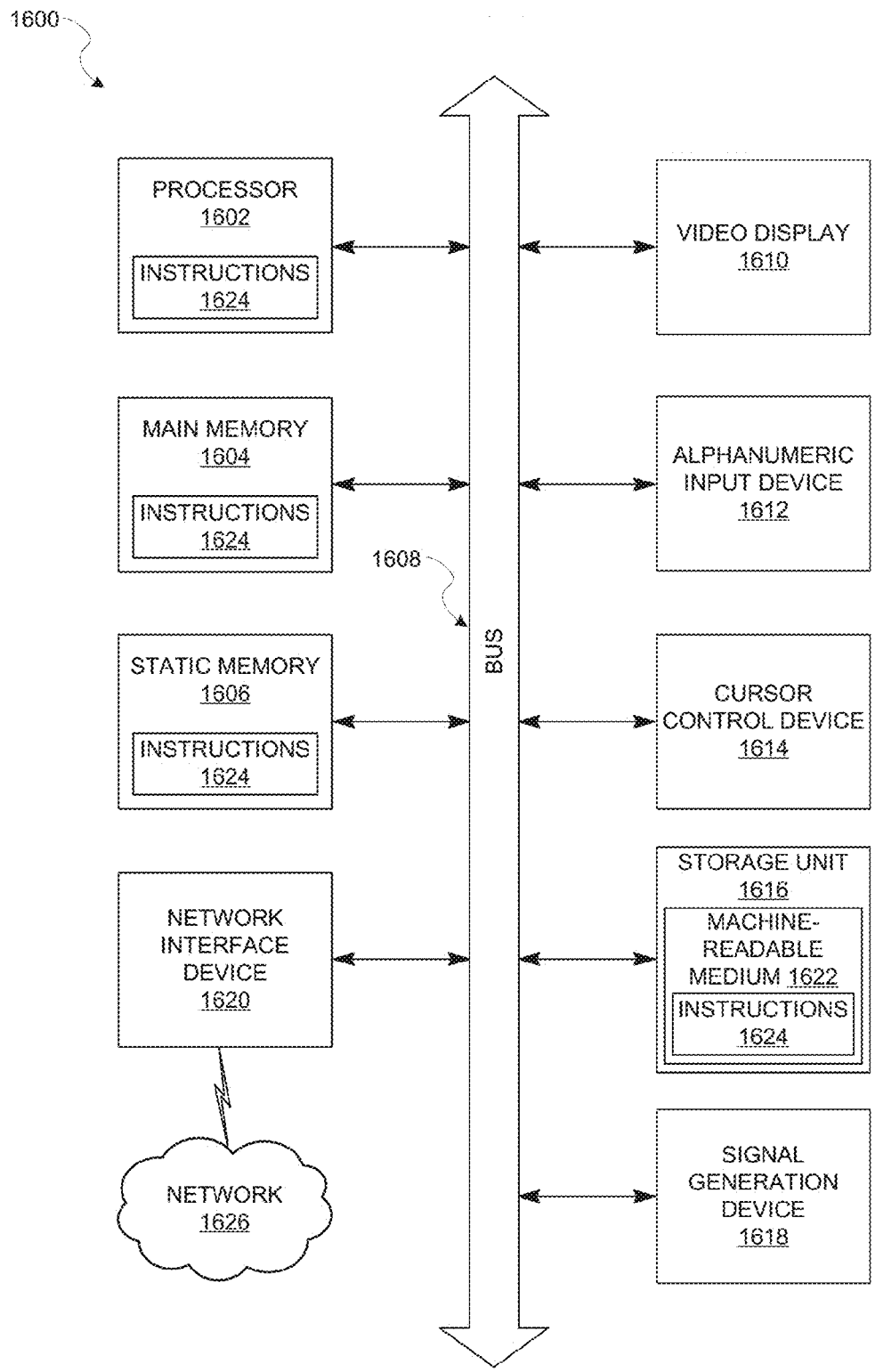
FIG. 16 illustrates a diagrammatic representation of a machine in the form of a computer system within which a set of instructions may be executed for causing the machine to perform any one or more of the methodologies discussed herein, according to an example embodiment.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1624 (e.g., software, a program, an application, an applet, app, or other executable code) for causing the machine 1600 to perform any one or more of the methodologies discussed herein may be executed. In alternative embodiments, the machine 1600 operates as a standalone device or may be connected (e.g., networked) to other machines. In a networked deployment, the machine 1600 may operate in the capacity of a server machine or a client machine in a server-client network environment, or as a peer machine in a peer-to-peer (or distributed) network environment. The machine 1600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1624, sequentially or otherwise, that specify actions to be taken by that machine. Further, while only a single machine 1600 is illustrated, the term "machine" shall also be taken to include a collection of machines 1600 that individually or jointly execute the instructions 1624 to perform any one or more of the methodologies discussed herein.

The machine 1600 includes a processor 1602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1604, and a static memory 1606, which are configured to communicate with each other via a bus 1608. The machine 1600 may further include a video display 1610 (e.g., a plasma display panel (PDP), a light emitting diode (LED) display, a liquid crystal display (LCD), a projector, or a cathode ray tube (CRT)). The machine 1600 may also include an alphanumeric input device 1612 (e.g., a keyboard), a cursor control device 1614 (e.g., a mouse, a touchpad, a trackball, a joystick, a motion sensor, or other pointing instrument), a storage unit 1616, a signal generation device 1618 (e.g., a speaker), and a network interface device 1620.

The storage unit 1616 includes a machine-readable medium 1622 on which is stored the instructions 1624 embodying any one or more of the methodologies or functions described herein. The instructions 1624 may also reside, completely or at least partially, within the main memory 1604, within the static memory 1606, within the processor 1602 (e.g., within the processor's cache memory), or both, during execution thereof by the machine 1600. Accordingly, the main memory 1604, static memory 1606 and the processor 1602 may be considered as machine-readable media 1622. The instructions 1624 may be transmitted or received over a network 1626 via the network interface device 1620.

As used herein, the term "memory" refers to a machine-readable medium 1622 able to store data temporarily or permanently and may be taken to include, but not be limited to, random-access memory (RAM), read-only memory (ROM), buffer memory, flash memory, and cache memory. While the machine-readable medium 1622 is shown in an example embodiment to be a single medium, the term "machine-readable medium" should be taken to include a single medium or multiple media (e.g., a centralized or distributed database, or associated caches and servers) able to store instructions 1624. The term "machine-readable medium" shall also be taken to include any medium, or combination of multiple media, that is capable of storing instructions (e.g., instruction 1624) for execution by a machine (e.g., machine 1600), such that the instructions, when executed by one or more processors of the machine 1600 (e.g., processor 1602), cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Furthermore, the machine-readable medium 1622 is non-transitory in that it does not embody a propagating signal. However, labeling the machine-readable medium 1622 as "non-transitory" should not be construed to mean that the medium is incapable of movement; the medium should be considered as being transportable from one physical location to another. Additionally, since the machine-readable medium 1622 is tangible, the medium may be considered to be a machine-readable device.

The instructions 1624 may further be transmitted or received over a communications network 1626 using a transmission medium via the network interface device 1620 and utilizing any one of a number of well-known transfer protocols (e.g., hypertext transfer protocol (HTTP)). Examples of communication networks include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 1624 for execution by the machine 1600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 1622 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure the processor 1602, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1602 that are temporarily configured (e.g., by software) or permanently configured to perform the relevant operations. Whether temporarily or permanently configured, such processors 1602 may constitute processor-implemented modules that operate to perform one or more operations or functions described herein. As used herein, "processor-implemented module" refers to a hardware module implemented using one or more processors 1602.

Similarly, the methods described herein may be at least partially processor-implemented, with a processor 1602 being an example of hardware. For example, at least some of the operations of a method may be performed by one or more processors 1602 or processor-implemented modules. Moreover, the one or more processors 1602 may also operate to support performance of the relevant operations in a "cloud computing" environment or as a "software as a service" (SaaS). For example, at least some of the operations may be performed by a group of computers (as examples of machines 1600 including processors 1602), with these operations being accessible via the network 1626 (e.g., the Internet) and via one or more appropriate interfaces (e.g., an application program interface (API)).

The performance of certain of the operations may be distributed among the one or more processors 1602, not only residing within a single machine 1600, but deployed across a number of machines 1600. In some example embodiments, the one or more processors 1602 or processor-implemented modules may be located in a single geographic location (e.g., within a home environment, an office environment, or a server farm). In other example embodiments, the one or more processors 1602 or processor-implemented modules may be distributed across a number of geographic locations.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    determining, using a hardware processor, a suggested event based on location information of a user device of a user, the user being a member of a social network service;
    causing presentation of event information corresponding to the suggested event on the user device;
    receiving a user attendance indication from the user device, the user attendance indication indicating that the user is attending the suggested event;
    in response to receiving the user attendance indication from the user device, identifying contact members having a relationship with the user on the social network service;
    identifying attendee members from among members of the social network service based on member attendance indications, each indication of the member attendance indications indicating a member of the social network service attending the suggested event, the identified attendee members not including the contact members of the user;
    generating an attendee list including at least a portion of the attendee members based on an analysis of profile data of the user and profile data of the attendee members; and
    causing presentation of an event notification on a client device of at least one of the contact members, the event notification including an indication that the user is attending the suggested event.

2. The method of claim 1, further comprising:
    causing presentation of the attendee list to the user after the suggested event has ended.

3. The method of claim 2, further comprising:
    facilitating the user to connect with the attendee members through the social network service.

4. The method of claim 1, further comprising:
    generating an attendee summary based on an analysis of profile data of the attendee members, the event information including the attendee summary.

5. The method of claim 1, further comprising:
    identifying attendee contact members from among the contact members based on member attendance indications; and
    generating an attendee contact list including at least a portion of the attendee contact members, the event information including the attendee contact list.

6. The method of claim 1, further comprising:
    identifying non-attendee contact members from among the contact members based on member attendance indications; and
    recommending attendance of the suggested event to the non-attendee contact members.

7. The method of claim 1, further comprising:
    determining the suggested event based on the user being within a user-specified distance of the suggested event.

8. The method of claim 1, further comprising:
    determining the suggested event based on an analysis of profile data of the user.

9. The method of claim 1, further comprising:
    receiving the user attendance indication in response to an attendance trigger.

10. The method of claim 9, wherein the attendance trigger is the user moving within a trigger distance of the suggested event.

11. The method of claim 1, wherein the event notification is caused to be presented to the contact members within a predetermined distance of the suggested event.

12. The method of claim 1, further comprising:
    facilitating admittance to the suggested event for the user.

13. A system comprising:
    at least one processor of a machine;
    an event module, executable by the at least one processor of the machine, to determine a suggested event based on location information of a user device of a user, the user being a member of a social network service;
    a notification module to cause presentation of event information that corresponds to the suggested event on the user device;
    the event module further to receive a user attendance indication from the user device, the user attendance indication indicates that the user is attending the suggested event;
    in response to receiving the user attendance indication from the user device, an analysis module to:
        identify contact members having a relationship with the user on the social network service,
        identify attendee members from among members of the social network service based on member attendance indications, each indication of the member attendance indications indicating a member of the social network service attending the suggested event, the identified attendee members not including the contact members of the user, and
        generate an attendee list including at least a portion of the attendee members based on an analysis of profile data of the user and profile data of the attendee members; and
    the notification module further to cause presentation of an event notification on a client device of at least one of the contact members, the event notification including an indication that the user is attending the suggested event.

14. The system of claim 13, wherein:
    the notification module is further to cause presentation of the attendee list to the user after the suggested event has ended.

15. The system of claim 14, wherein the event module is further to facilitate the user to connect with the attendee members through the social network service.

16. The system of claim 13, wherein the analysis module is further to generate an attendee summary based on an analysis of profile data of the attendee members, the event information to include the attendee summary.

17. The system of claim 13, wherein the analysis module is further to:
    identify attendee contact members from among the contact members based on member attendance indications; and
    generate an attendee contact list that includes at least a portion of the attendee contact members, the event information to include the attendee contact list.

18. A non-transitory machine readable medium that stores instructions that, when executed by a machine, cause the machine to:
- determine a suggested event based on location information of a user device of a user, the user being a member of a social network service;
- cause presentation of event information corresponding to the suggested event on the user device;
- receive a user attendance indication from the user device, the user attendance indication indicating that the user is attending the suggested event;
- in response to receiving the user attendance indication from the user device, identify contact members having a relationship with the user on the social network service;
- identify attendee members from among members of the social network service based on member attendance indications, each indication of the member attendance indications indicating a member of the social network service attending the suggested event, the identified attendee members not including the contact members of the user;
- generate an attendee list including at least a portion of the attendee members based on an analysis of profile data of the user and profile data of the attendee members; and
- cause presentation of an event notification on a client device of at least one of the contact members, the event notification including an indication that the user is attending the suggested event.

* * * * *